United States Patent
Wang et al.

(10) Patent No.: US 7,274,828 B2
(45) Date of Patent: Sep. 25, 2007

(54) METHOD AND APPARATUS FOR DETECTING AND PROCESSING NOISY EDGES IN IMAGE DETAIL ENHANCEMENT

(75) Inventors: Xianglin Wang, Santa Ana, CA (US); Yeong-Taeg Kim, Irvine, CA (US)

(73) Assignee: Samsung Electronics Co., Ltd., Suwong (KR)

( * ) Notice: Subject to any disclaimer, the term of this patent is extended or adjusted under 35 U.S.C. 154(b) by 914 days.

(21) Appl. No.: 10/660,329

(22) Filed: Sep. 11, 2003

(65) Prior Publication Data

US 2005/0058365 A1   Mar. 17, 2005

(51) Int. Cl.
    G06K 9/40   (2006.01)
(52) U.S. Cl. ............... 382/266; 382/260; 382/274; 382/275; 358/3.26; 358/3.27; 358/463
(58) Field of Classification Search ............... 382/160, 382/263, 269, 274, 275; 358/3.26, 3.27, 358/523, 463
See application file for complete search history.

(56) References Cited

U.S. PATENT DOCUMENTS

| | | | |
|---|---|---|---|
| 5,130,798 A | * | 7/1992 | Christopher ............... 348/620 |
| 5,563,652 A | * | 10/1996 | Toba et al. ............ 348/207.99 |
| 6,002,431 A | * | 12/1999 | Jung et al. ............. 348/207.99 |
| 6,097,847 A | * | 8/2000 | Inoue ......................... 382/266 |
| 6,115,071 A | * | 9/2000 | Hurst et al. ............ 375/240.12 |
| 6,195,132 B1 | * | 2/2001 | Kimura et al. .............. 348/618 |
| 2004/0189874 A1 | | 9/2004 | Wang et al. ................ 348/627 |

* cited by examiner

*Primary Examiner*—Yosef Kassa
(74) *Attorney, Agent, or Firm*—Kenneth L. Sherman, Esq.; Michael Zarrabian, Esq.; Myers Dawes Andras & Sherman, LLP

(57) ABSTRACT

A method and system that detect image pixels of noisy and sharp image edges, and enhance such pixels differently than other pixels, so that noise around the detected pixels is essentially not boosted. A detection process is conducted on a pixel basis, wherein each pixel is checked together with its neighboring pixels inside a rectangular window centered around a selected/current pixel to determine whether the current pixel belongs to a noisy and sharp vertical image edge or a noisy and sharp horizontal image edge. If the current pixel is classified as a regular pixel, image detail enhancement is performed normally at the current pixel location. Otherwise, mean values of pixels in a rectangular window centered with the current pixel are used to calculate the unsharp signal. The unsharp signal is then processed as in the case of the regular pixels to obtain a detail enhanced image.

74 Claims, 10 Drawing Sheets

(a)

(b)

900

(a)          (b)

METHOD AND APPARATUS FOR DETECTING AND PROCESSING NOISY EDGES IN IMAGE DETAIL ENHANCEMENT

FIELD OF THE INVENTION

The present invention relates to image detail enhancement, and in particular, to image detail enhancement to improve the sharpness of an image.

BACKGROUND OF THE INVENTION

Image detail enhancement is frequently used in digital video systems such as digital television sets. A goal of image detail enhancement is to improve the image sharpness. As such, image high frequency components that contain image details are extracted, enhanced and added back to the original image so that the details in the processed image become more obvious to a viewer.

FIG. 1 shows a block diagram of a conventional image detail enhancement system 10, also known as unsharp masking. An original image $f$ is passed through a low pass filter (LPF) 12 to obtain an image $f_1$ (unsharp signal), wherein the image $f_1$ is subtracted from the original image $f$ in a node 14, to obtain the difference $(f-f_1)$. The difference $(f-f_1)$ is then boosted by a factor of K (K>0) in a multiplier 16, before being added back to the original image $f$ in a node 18, to generate an enhanced output image g. The relationship between the output signal g and the input signal $f$ can be expressed as:

$$g=(f-f_1)*K+f \qquad (1)$$

The low pass filter 12 can be either a one dimensional (1D) filter or a two dimensional (2D) filter. If it is a 1D filter, the detail enhancement process can be performed along the horizontal and vertical directions separately.

A shortcoming of such conventional image detail enhancement systems is that in addition to enhancing image details, image noise may also be enhanced. Typically image noise consists of high frequency, and as such it is extracted and boosted during such detail enhancement processes.

To control noise in detail enhancement, some conventional detail enhancement systems apply a coring function to the extracted high frequency component $(f-f_1)$. FIG. 2 shows a block diagram of such a detail enhancement system 20 further including a coring block 22, wherein the relationship between the output signal g and the input signal $f$ can be expressed as:

$$g=K*coring(f-f_1)+f \qquad (2)$$

Different coring functions can be utilized, and an example coring function can be:

$$coring(x) = \begin{cases} 0 & \text{if } |x| < T \\ x & \text{if } |x| \geq T \end{cases} \qquad (3)$$

Basically, the example coring function truncates small amplitude input values of x to 0 and leaves large amplitude value of x unchanged. A threshold value T is used to check the amplitude value of x. A coring function is useful in preventing noise enhancement in a flat image area. This is because in a flat image area, the amplitude of $(f-f_1)$ is relatively low and may be truncated to 0 by the coring function, whereby noise in those areas is not boosted. However, for noise along image edge areas, a coring function is not effective.

Yet another conventional detail enhancement system that attempts to control noise, utilizes checking the local variance at each pixel location and adjusts the enhancement gain accordingly (i.e., the enhancement gain is adaptively adjusted based on the local variance level). FIG. 3 shows a block diagram of such a detail enhancement system 30 which includes a local variance checker 32. The variance checker 32 checks the local variance around a current pixel, wherein a parameter α $(0 \leq \alpha \leq 1)$ is generated based on the variance level. The higher the local variance value, the larger the value of α. The relationship between the output signal g and the input signal $f$ can be expressed as:

$$g=(f-f_1)*K*\alpha+f \qquad (4)$$

Such a system also helps prevent noise in a flat image area from being enhanced. In a flat image area, local variance level is low and therefore α has a small value. As a result, according to relation (4), flat image areas are not much enhanced and noise is not boosted substantially.

However, a shortcoming of the above detail enhancement systems is that neither system can prevent noise enhancement around image edge areas. When noise around image edge area is enhanced, it can have very undesirable results. FIG. 4 shows an example of noise enhancement around image edge areas, by a detail enhancement process. FIG. 4(a) shows the original image with noise, and FIG. 4(b) shows the detail enhanced image. In this example, both a coring function and local variance checking are used in the detail enhancement process to suppress noise. However, it can be seen in FIG. 4(b) that noise around image edge areas is still substantially enhanced (each small rectangular block in FIG. 4 is size of a pixel). Such poor results (artifacts) are especially obvious for sharp image edges having a horizontal or vertical direction. For a slant image edge, such artifacts are less visible.

There is, therefore, a need for a method and system for detecting and processing noisy edge in an image detail enhancement process so that noise enhancement around edge areas is virtually eliminated.

BRIEF SUMMARY OF THE INVENTION

The present invention addresses the above needs. In one embodiment the present invention provides a method and system that detects image pixels of noisy and sharp (horizontal or vertical) image edges, and enhances these pixels differently than other pixels, so that noise around the detected pixels is essentially not boosted. In one example, the detection process is conducted on a pixel basis, wherein each pixel is checked together with its neighboring pixels inside a rectangular window centered around a selected/current pixel. To determine whether the current pixel belongs to a noisy and sharp vertical image edge, three columns of pixels centered with the current pixel are used. The mean value and variance value of the pixels in each column are calculated. Based on the three mean values and the three variance values, it can be determined if the current pixel is a pixel in a noisy and sharp vertical edge. Similarly, the current pixel can be checked to determine if it is a pixel in a noisy and sharp horizontal image edge.

After such a checking process, the current pixel can be classified as one of the following three cases: (1) a regular pixel, (2) a pixel in a noisy and sharp vertical image edge, or (3) a pixel in a noisy and sharp horizontal image edge. If the current pixel is classified as a regular pixel, image detail enhancement is performed normally at the current pixel location. In this case, an unsharp signal at the location of the current signal is obtained by applying a LPF to the original image pixels. Otherwise, mean values of pixels in a rectangular window centered with the current pixel are used to calculate the unsharp signal. If the current pixel is classified as a pixel in a noisy and sharp vertical edge, then a pixel mean value for each column of the rectangular window is calculated. If the LPF is a 1D filter, then an unsharp signal can be obtained by simply applying the LPF to the pixel mean values. However, if the LPF is a 2D filter, then an unsharp signal can be obtained by applying the LPF to a 2D data array having the same size as the rectangular window. Each column of the data array is filled with the pixel mean value of the corresponding column of the rectangular window. The unsharp signal is then processed as in the case of the regular pixels above, to obtain a detail enhanced image.

The enhancement can be performed in a symmetrical manner when the current pixel is classified as a pixel in a noisy and sharp horizontal edge. Through such a processing, according to the present invention, noise around horizontal or vertical image edges can be effectively suppressed in the detail enhancement process, without sacrificing enhancement of other image details (pixels). Other objects, features and advantages of the present invention will be apparent from the following specification taken in conjunction with the following drawings.

DETAILED DESCRIPTION OF THE INVENTION

Figure 5:
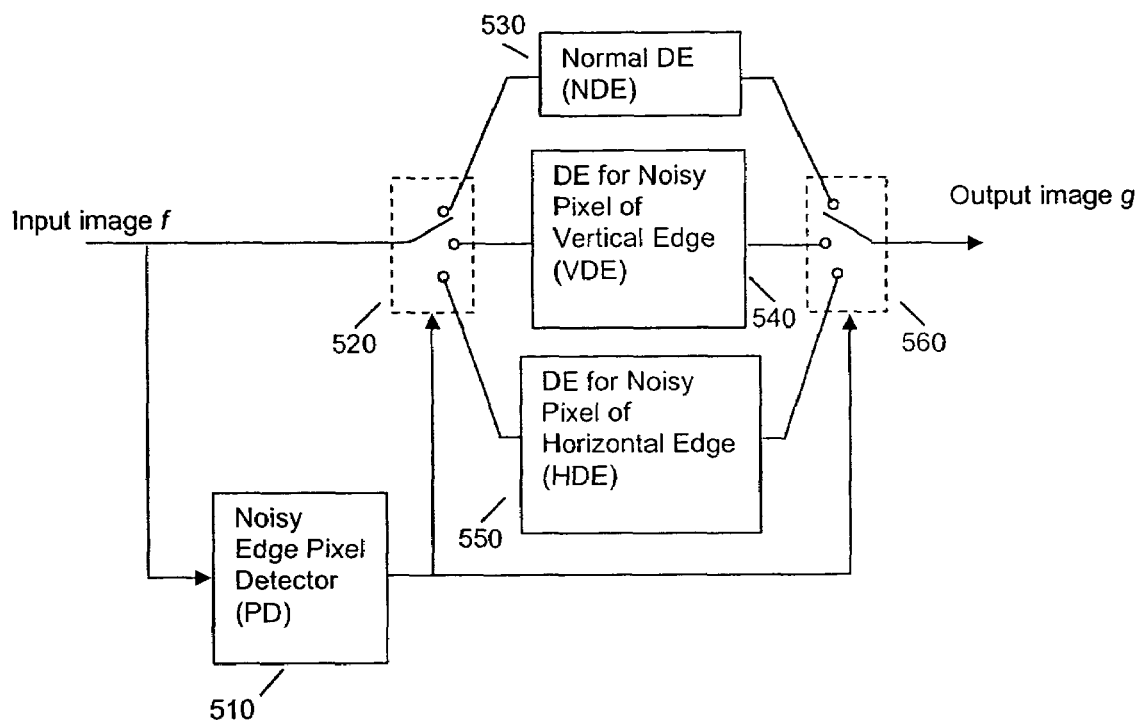
FIG. 5 is an example block diagram of an embodiment of a detail enhancement system according to the present invention.

Referring to the example functional block diagram in FIG. 5, in one embodiment the present invention provides a detail enhancement system 500 that detects image pixels of noisy and sharp (horizontal or vertical) image edges, and enhances these pixels differently than other pixels, so that noise around the detected pixels is essentially not boosted. In one example, the detection process is conducted on a pixel basis, wherein each pixel is checked together with its neighboring pixels inside a rectangular window centered around a selected/current pixel. To determine whether the current pixel belongs to a noisy and sharp vertical image edge, three columns of pixels centered with the current pixel are used. The mean value and variance value of the pixels in each column are calculated. Based on the three mean values and the three variance values, it can be determined if the current pixel is a pixel in a noisy and sharp vertical edge. Similarly, the current pixel can be checked to determine if it is a pixel in a noisy and sharp horizontal image edge.

After such a checking process, the current pixel can be classified as one of the following three cases: (i) a regular pixel, (ii) a pixel in a noisy and sharp vertical image edge, or (iii) a pixel in a noisy and sharp horizontal image edge. If the current pixel is classified as a regular pixel, image detail enhancement is performed normally at the current pixel location. In this case, an unsharp signal is obtained by applying a LPF to the original image pixels.

Otherwise, if the current pixel is classified as a pixel in a noisy and sharp vertical edge, mean values of pixels in a rectangular window centered with the current pixel are used to calculate the unsharp signal (a pixel mean value for each column of the rectangular window is calculated). If the LPF is a 1D filter, then an unsharp signal can be obtained by simply applying the LPF to the pixel mean values. However, if the LPF is a 2D filter, then an unsharp signal can be obtained by applying the LPF to a 2D data array having the same size as the rectangular window. Each column of the data array is filled with the pixel mean value of the corresponding column of the rectangular window. The unsharp signal is then processed as in the case of the regular pixels above, to obtain a detail enhanced image.

The enhancement can be performed in a symmetrical manner when the current pixel is classified as a pixel in a noisy and sharp horizontal edge. Through such a processing, according to the present invention, noise around horizontal or vertical image edges can be effectively suppressed in the detail enhancement process, without sacrificing enhancement of other image details (pixels).

As shown in FIG. 5, the detail enhancement system 500 includes a Noisy Edge Pixel Detector ("PD") 510, a first switch 520, a Normal Detail Enhancement block ("NDE") 530, a Detail Enhancement block for Noisy Pixels in Vertical Edges ("VDE") 540, a Detail Enhancement block for Noisy Pixels in Horizontal Edges ("HDE") 550, and a second switch 560. The input to the detail enhancement system 500 is an original image f, and the output of the detail enhancement system is a detail enhanced image g.

The PD 510 determines whether a selected/current image pixel is a pixel in a noisy and sharp horizontal or vertical image edge, and generates a corresponding control signal indicating that the pixel classification/status is either: (i) a regular pixel, (ii) a pixel in a noisy and sharp vertical image edge, or (iii) a pixel in a noisy and sharp horizontal image edge. The two switches 520, 560 are both controlled by the output control signal from the PD 510. The two switches

520, 560 are synchronized with each other, wherein depending on the output from the PD 510 (representing the pixel status), one of the corresponding detail enhancement block/modules NDE 530, VDE 540 or HDE 550 is selected for enhancing the current pixel.

The PD 510 determines the pixel status on a pixel-by-pixel basis, wherein each selected/current pixel is checked together with its neighboring pixels that reside in a rectangular window defined in the original image, wherein in the example described herein the window is centered with the current pixel. The following description is for the process of checking if a current pixel belongs to a noisy and sharp vertical image edge. As those skilled in the art will recognize, the process can be performed in a symmetrical fashion for the case of horizontal image edges.

Figure 6:
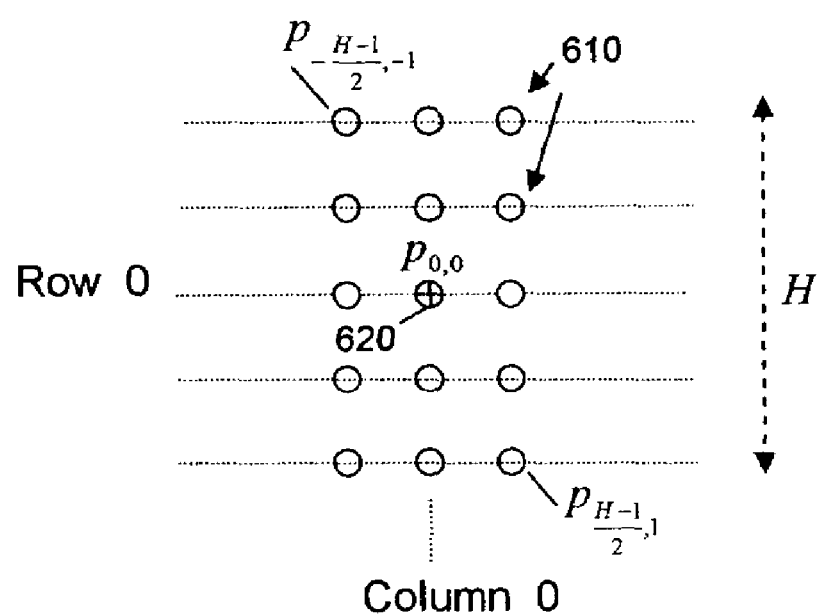
FIG. 6 shows pixels inside an example rectangular window, wherein the pixels are used in detecting if a selected/current pixel is in a noisy and sharp vertical image edge.
Figure 7:
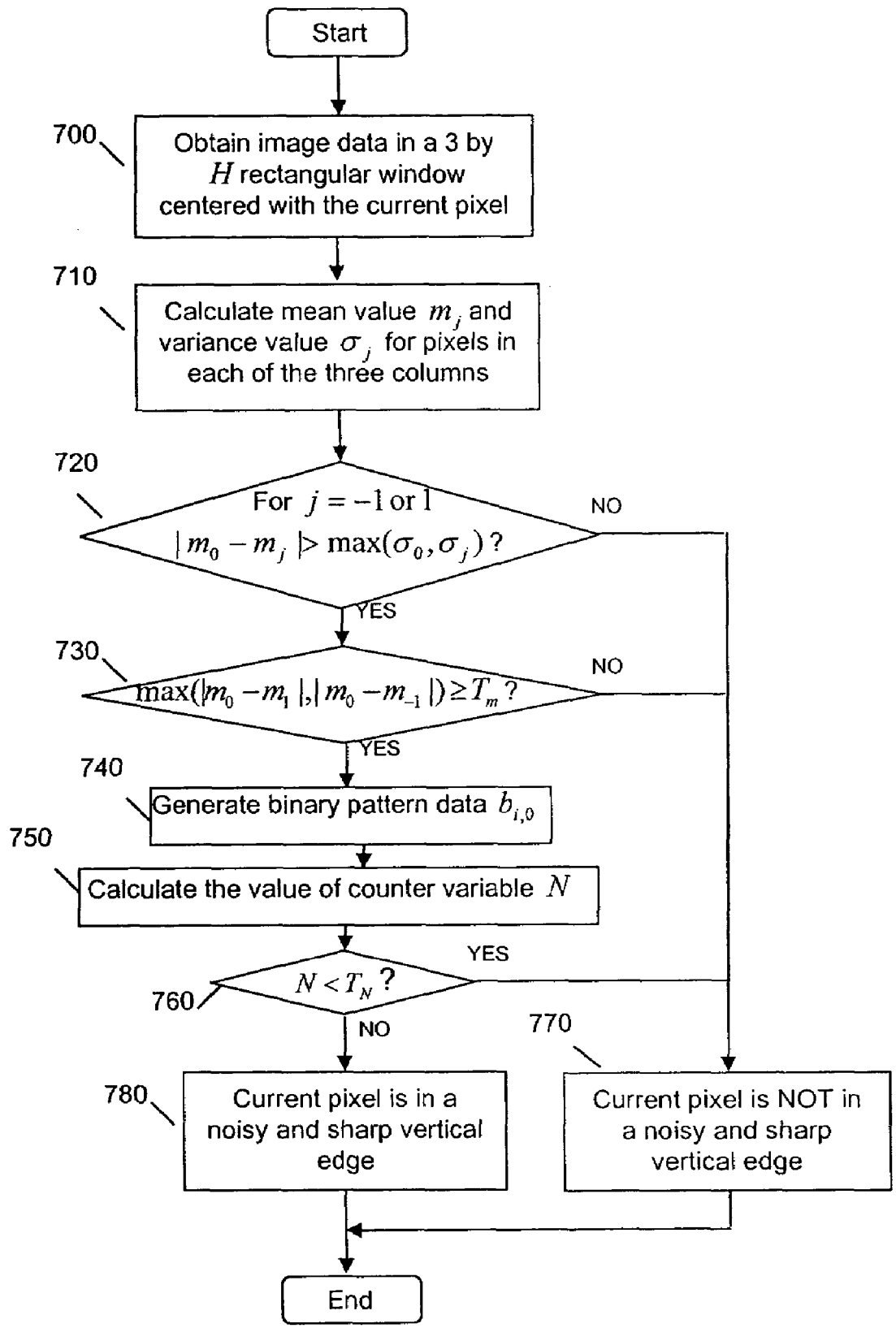
FIG. 7 is an example flowchart of an embodiment of a process of checking whether a current pixel belongs to a noisy and sharp vertical image edge, according to the present invention.

FIG. 6 shows a diagram representing a window 600 including pixels 610, wherein the window 600 is centered on a selected/current pixel 620, for checking whether the current pixel 620 is in a noisy and sharp vertical image edge. FIG. 7 shows an example flowchart of the steps of a process implemented in an embodiment of the PD 510 for checking whether the current pixel 620 belongs to a noisy and sharp vertical edge, according to the present invention. A number W of columns of image pixels, having a number of H pixels in each column, are utilized (step 700). As shown in FIG. 6, the current pixel 620 is represented as a circle with a cross inside, and the hollow circles 610 represent neighboring samples/pixels of the current pixel 620. In this example W=3 and H=5, however, H and W may be other (odd) integers. Each pixel 610 inside the window 600 is denoted as $p_{i,j}$, wherein i and j represent the window row and column index for the corresponding pixel, respectively. The luminance value of $p_{i,j}$ is denoted as $I_{i,j}$. As the window 600 is centered on the current pixel 620, the row and column index for the current pixel 620 (denoted as $p_{0,0}$) are 0 as indicated in FIG. 6.

To determine whether the current pixel 620 is in a noisy and sharp vertical image edge, in step 710 the PD 610 calculates the mean value m and variance value σ of the pixels in each of the three columns in the window 600 using examples relations (5) and (6), respectively, wherein:

$$m_j = \frac{1}{H} \sum_{i=-\frac{H-1}{2}}^{\frac{H-1}{2}} I_{i,j} \quad j = -1, 0, 1 \quad (5)$$

$$\sigma_j = \frac{1}{H} \sum_{i=-\frac{H-1}{2}}^{\frac{H-1}{2}} |I_{i,j} - m_j| \quad j = -1, 0, 1 \quad (6)$$

Based on the three mean values and the three variance values calculated above, then the PD 510 in steps 720, 730 checks the following conditions (7) and (8), respectively, to determine whether the current pixel 620 belongs to a sharp vertical edge, wherein:

$$|m_0 - m_j| > \max(\sigma_0, \sigma_j) \, j = -1 \text{ or } 1 \quad (7)$$

$$\max(|m_0 - m_{-1}|, |m_0 - m_{31\,1}|) \geq T_m \quad (8)$$

where $T_m$ is a predetermined threshold value. Only if both conditions (7) and (8) are true, is the current pixel 620 considered as a pixel in a sharp vertical edge. If condition (7) is false, then pixels in column 0 where the current pixel 620 resides, are not considered separable from the pixels in neighboring columns in terms of their luminance level, and the current pixel 620 is not considered a pixel in a vertical edge. If condition (8) is false, then the luminance change is not considered dramatic along the horizontal direction, indicating that, the vertical edge, if exists, is not sharp enough.

If both conditions (7) and (8) are true, wherein the current pixel 620 is considered as belonging to a sharp vertical edge, then the vertical edge is checked below to determine if it is noisy. To do so, in this example, first the PD 510 generates a two-dimensional binary pattern including data values $b_{i,j}$, wherein row and column indices i, j in the binary pattern are as used for the window 600. In this embodiment, the binary pattern including the data values $b_{i,j}$ is generated from the values of pixels in column 0 of the window 600 (step 740), using the relation:

$$b_{i,0} = \begin{cases} 0 & \text{if } I_{i,0} < m_0 \\ 1 & \text{if } I_{i,0} \geq m_0 \end{cases} \quad i = -\frac{H-1}{2}, \ldots, 0, \ldots, \frac{H-1}{2} \quad (9)$$

such that, in total, there are H such binary pattern data in column 0. Then, neighboring binary pattern data are checked to determine whether they have the same or different values. To do so, a counter variable N is updated to count the number of neighboring binary pattern data that vary from each other (step 750), wherein:

$$N = \sum_{i=-\frac{H-1}{2}}^{\frac{H-1}{2}-1} |b_{i,0} - b_{i+1,0}| \quad (10)$$

The counter variable N can also be equivalently defined with an exclusive OR operation as follows:

$$N = \sum_{i=-\frac{H-1}{2}}^{\frac{H-1}{2}-1} (b_{i,0} \oplus b_{i+1,0}) \quad (11)$$

wherein the symbol ⊕ represents exclusive OR operation on binary data.

According to the relations (10) and/or (11) above, the value range of N is [0, H−1], wherein the value of the counter variable N indicates if the vertical edge is noisy. For a "clean" vertical edge, N is expected to have a small value, and for a "noisy" vertical edge, N is expected to have a relatively large value. A simple example of determining if the current vertical edge is noisy or not, is to define a threshold value $T_N$ (0<$T_N$<H−1) and to compare the value of N with $T_N$ (step 760). If the value of N is less than $T_N$, then the vertical edge which includes the current pixel 620 is considered as a clean edge (step 770). Otherwise, the current pixel 620 is considered as belonging to a noisy and sharp vertical edge (step 780).

Figure 1:
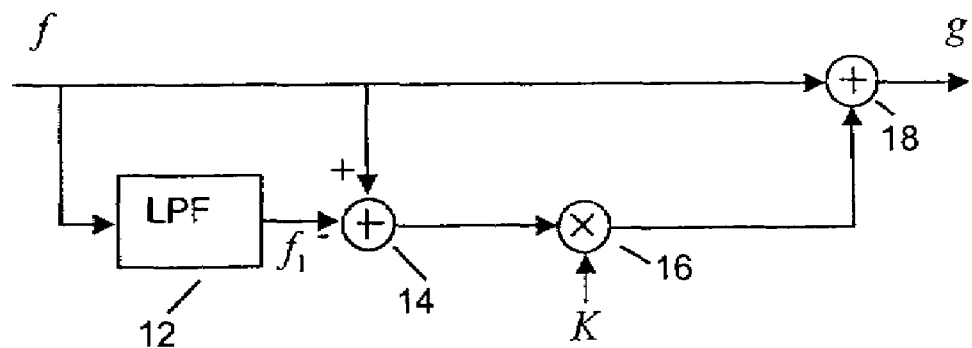
FIG. 1 shows a block diagram of a conventional detail enhancement system.
Figure 2:
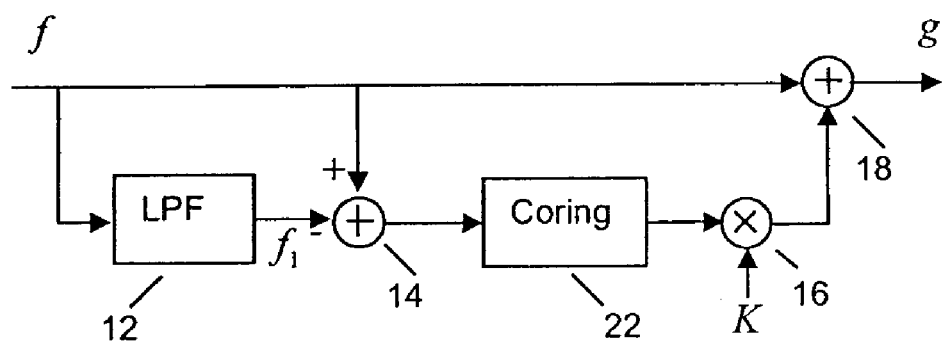
FIG. 2 shows a block diagram of another conventional detail enhancement system which includes a coring function block.
Figure 3:
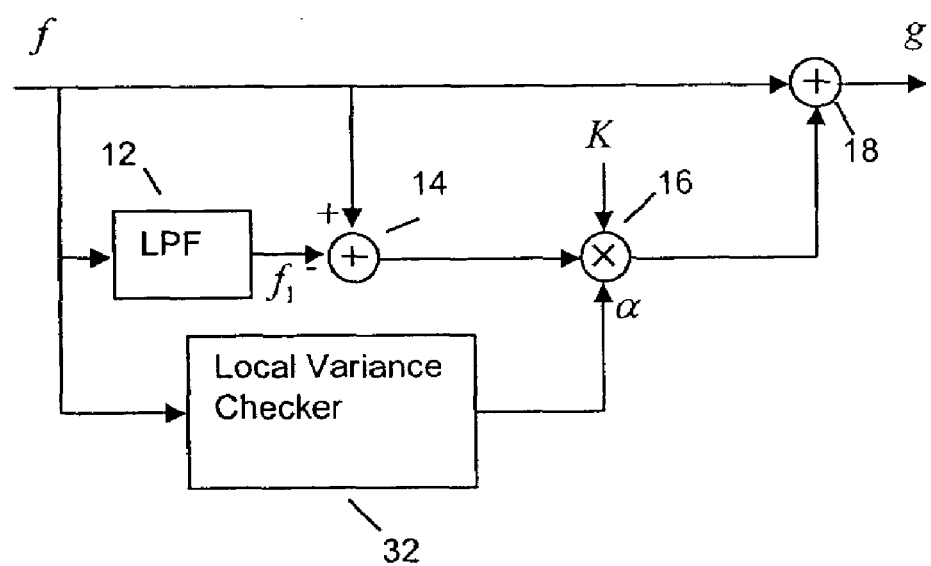
FIG. 3 shows a block diagram of another conventional detail enhancement system which includes a local variance checking block.

As such, if according to the above process the PD 510 determines that the current pixel 620 is a regular pixel, the current pixel 620 can be enhanced normally in the NDE 530 (FIG. 5) which implements a detail enhancement system such as shown in one or more of FIGS. 1-3. Otherwise, depending on the detected pixel status as either a pixel in a noisy and sharp vertical image edge, or a pixel in a noisy and sharp horizontal image edge, the current pixel 620 is enhanced by the VDE 540 or the HDE 550, respectively.

As noted, the description herein provides an example of a detail enhancement process in the VDE 540 when the current pixel is in a noisy and sharp vertical image edge. A similar process can be implemented in the HDE 550, as those skilled in the art will appreciate.

Figure 8:
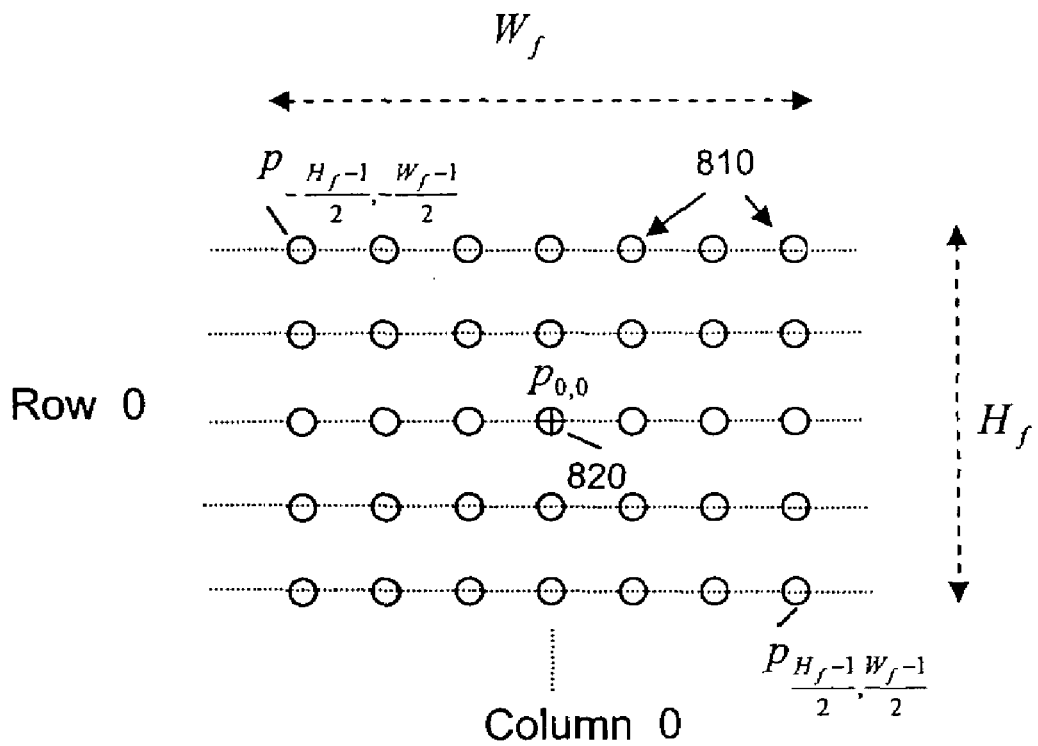
FIG. 8 is an example diagram showing neighboring pixels in a $W_f$ by $H_f$ rectangular window centered with the current pixel, wherein these pixels are utilized to obtain an unsharp signal when the current pixel is detected as being in a noisy and sharp vertical edge area.

FIG. 8 shows an example diagram of a $W_f$ by $H_f$ rectangular window 800 in the original image, wherein the window 800 includes pixels 810 and is centered with the current pixel 820. In this example, both $W_f$ and $H_f$ are odd number values. If the current pixel 820 is detected as being in a noisy and sharp vertical edge area by the PD 510, then at least a plurality of the pixels 810 in the window 800 are utilized to obtain an unsharp signal at the location of pixel 820. In one embodiment of detail enhancement process in the VDE 540, a plurality of neighboring pixels 810 in the window 800 are utilized to obtain the unsharp signal $f_1$, using a low pass filter (LPF). If the LPF is a 1D filter with an odd number of filter taps, then $W_f$ can be set equal to the length of the filter. And, if the LPF is a 2D filter, then $W_f$ and $H_f$ can be set equal to the horizontal length and vertical length of the filter, respectively.

In one implementation of said enhancement process in the VDE 540, the pixel mean value of each column in the rectangular window of FIG. 8 is calculated as:

$$M_j = \frac{1}{H_f} \sum_{i=-\frac{H_f-1}{2}}^{\frac{H_f-1}{2}} I_{i,j} \quad j = -\frac{W_f-1}{2}, \ldots, 0 \ldots, \frac{W_f-1}{2} \quad (12)$$

$I_{i,j}$ represents the luminance value of $p_{i,j}$. The unsharp signal $f_1$ is then calculated by applying the LPF to the mean values. If the LPF is a 1D filter with a length of $W_f$, the normalized filter coefficients are represented as $h_j$, $$j = -\frac{W_f-1}{2}, \ldots, 0 \ldots, \frac{W_f-1}{2},$$

then the LPF filter is applied to the mean values $$M_j, j = -\frac{W_f-1}{2}, \ldots, 0 \ldots, \frac{W_f-1}{2}$$

through a convolution operation as follows:

$$J = \sum_{j=-\frac{W_f-1}{2}}^{\frac{W_f-1}{2}} (M_j * h_{-j}) \quad (13)$$

The filter output J represents the unsharp signal $f_1$.

Figure 9:
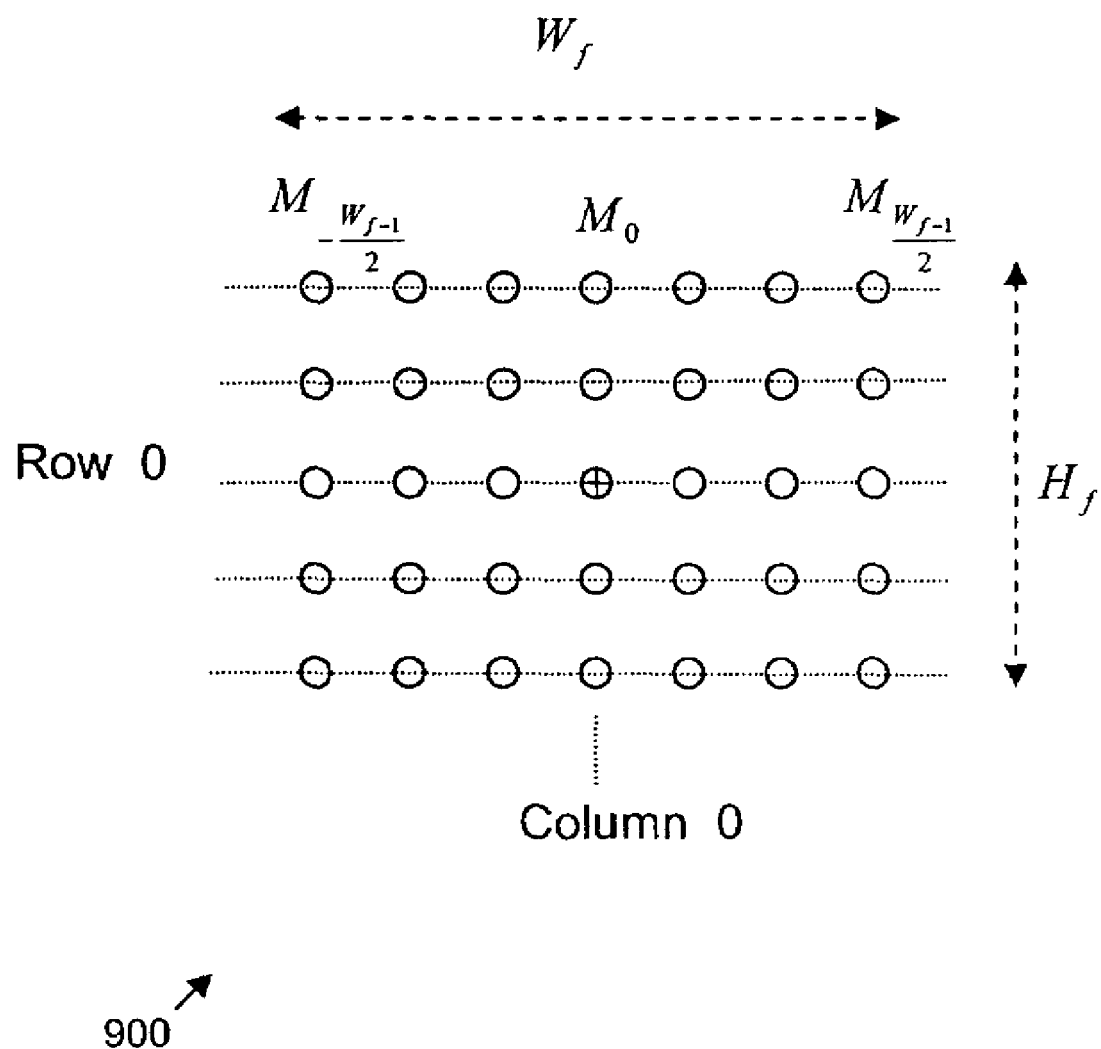
FIG. 9 shows an example 2D data array that can be used to obtain an unsharp signal when the current pixel is detected as being in a noisy and sharp vertical edge area.

Otherwise, if the LPF is a 2D filter, then a 2D data array 900 such as shown by example in FIG. 9 is generated, wherein the data array is the same size as the rectangular window shown in FIG. 8. As mentioned above, $W_f$ and $H_f$ can be set equal to the horizontal length and vertical length of the filter, respectively. Each column of the data array in FIG. 9 includes the pixel mean values of each corresponding column of the rectangular window shown in FIG. 8. As such, in the data array 900 of FIG. 9, the data values in column 0 all have a value of $M_0$, the data values in column $$\frac{W_f-1}{2}$$

all have a value of $$M_{\frac{W_f-1}{2}},$$

and so on. As such, in general, the data values in column j of the data array 900 all have a value of $M_j$, where $$j = -\frac{W_f-1}{2}, \ldots, 0 \ldots, \frac{W_f-1}{2}.$$

Assuming the normalized coefficients of the 2D FIR filter are $$h_{i,j}, i = -\frac{H_f-1}{2}, \ldots, 0 \ldots, \frac{H_f-1}{2},$$

$$j = -\frac{W_f-1}{2}, \ldots, 0 \ldots, \frac{W_f-1}{2},$$

the 2D filter can be applied to the 2D data array in FIG. 9 through a convolution operation as follows:

$$J = \sum_{i=-\frac{H_f-1}{2}}^{\frac{H_f-1}{2}} \sum_{j=-\frac{W_f-1}{2}}^{\frac{W_f-1}{2}} (M_j * h_{-i,-j}) \quad (14)$$

The filter output J represents the unsharp signal $f_1$.

Once the unsharp signal $f_1$ is obtained, the remaining steps of the detail enhancement process in the VDE 540 are the same as that for the regular pixels in the NDE 30, described above.

Figure 4:
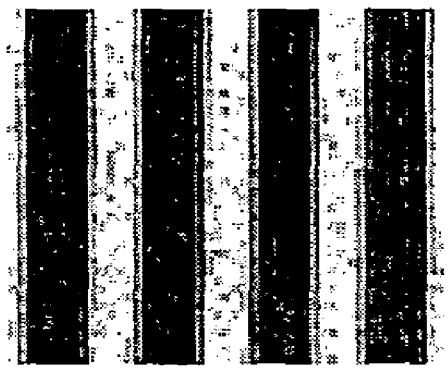
FIG. 4(a) shows an example original image with vertical image edges.
FIG. 4(b) is a detail enhanced version of the image in FIG. 4(a) using conventional detail enhancement systems.
Figure 4:
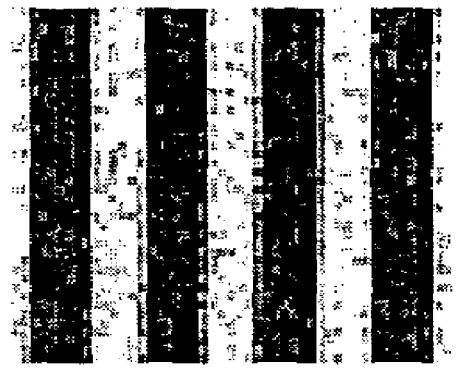
Figure 10:
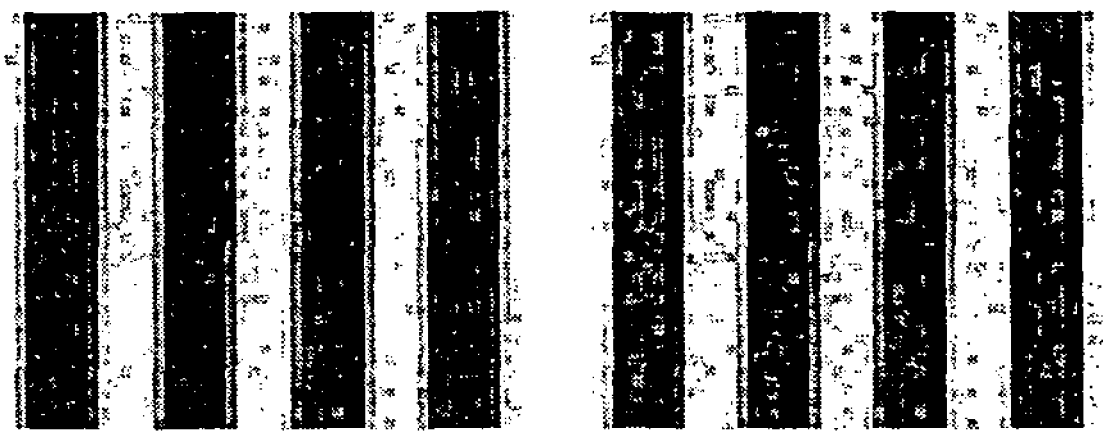
FIG. 10(a) shows an example original image with vertical image edges.
FIG. 10(b) is a detail enhanced version of the image in FIG. 10(a) using a detail enhancement process according to the present invention.

According to the detection and processing explained above, noise around sharp horizontal or vertical image edge can be effectively suppressed in detail enhancement processes. An enhancement result according to an embodiment of the present invention is shown in FIG. 10, wherein FIG. 10(a) shows an original image (same as that in FIG. 4(a)), and FIG. 10(b) shows the enhanced images using the detection and processing steps according to the present invention. Comparing the result in FIG. 10(b) with the original image in FIG. 10(a), it can be seen that the noise around the enhanced edge is not boosted. Comparing the result in FIG. 10(b) with the result in FIG. 4(b), there is an obvious suppression of noise around image edge area.

Although the description above refer to the case for a vertical image edge, as those skilled in the art recognize, the detection and processing for a pixel on a noisy and sharp horizontal edge can be performed in a symmetrical manner. For example, detecting if a current image pixel belongs to a horizontal image edge, includes the steps of: selecting at least H rows of pixels centered with the current pixel, wherein each row includes W pixels; determining the mean value of the pixels in each row, thereby generating H mean values; determining the variance value of the pixels in each row, thereby generating H variance values; and based on the H mean values and the H variance values, determining if the current pixel belongs to a horizontal image edge (e.g., using a threshold value in a manner similar to that described above and shown in FIG. 7 for a vertical edge).

The mean values $m_i$ are determined according to the relation:

$$m_i = \frac{1}{W} \sum_{j=-\frac{W-1}{2}}^{\frac{W-1}{2}} I_{i,j}, \quad i = -1, 0, 1, \tag{15}$$

and the variance values are determined according to the relation:

$$\sigma_i = \frac{1}{W} \sum_{j=-\frac{W-1}{2}}^{\frac{W-1}{2}} |I_{i,j} - m_i|, \quad i = -1, 0, 1, \tag{16}$$

where $I_{i,j}$ is the luminance value of a pixel $p_{i,j}$ located at row i and column j in the window, such that the row and column index of the current pixel is 0.

Detecting if the current pixel belongs to a horizontal image edge, further includes determining if:

$$|m_0 - m_i| > \max(\sigma_0, \sigma_i), i = -1 \text{ or } 1; \tag{17}$$

and determining if:

$$\max(|m_0 - m_1|, |m_0 - m_{-1}|) \geq T_m; \tag{18}$$

where $T_m$ is a predetermined threshold value.

If both the above conditions (17) and (18) are true, then the current pixel is considered as a pixel in a horizontal image edge. If the selected pixel is determined to belong to an image edge, then determining if the horizontal edge is noisy.

In one example, checking if the horizontal edge is noisy further includes the steps of generating a binary pattern data $b_{0,j}$ from pixels in row 0 of said window according to the relation:

$$b_{0,j} = \begin{cases} 0 & \text{if } I_{0,j} < m_0 \\ 1 & \text{if } I_{0,j} \geq m_0 \end{cases} \quad j = -\frac{W-1}{2}, \cdots, 0, \cdots, \frac{W-1}{2}; \tag{19}$$

and based on the binary pattern data, generating a count N of the number of neighboring binary pattern data that vary from each other according to the relation:

$$N = \sum_{j=-\frac{W-1}{2}}^{\frac{W-1}{2}-1} |b_{0,j} - b_{0,j+1}|; \tag{20}$$

and then comparing the count N to a predetermined threshold value:

$$T_N, 0 < T_N < W - 1; \tag{21}$$

such that if the count N is not less than $T_N$, then the edge is considered as noisy.

Relation (20) above can be substituted with the following equivalent relation:

$$N = \sum_{j=-\frac{W-1}{2}}^{\frac{W-1}{2}-1} (b_{0,j} \oplus b_{0,j+1}); \tag{22}$$

To generate unsharp signal, pixels in a $W_f$ by $H_f$ rectangular window centered with the current pixel are used. As noted, if the image edge direction is horizontal, then determining the mean values of the pixels in each row of the window, wherein there are a total of $H_f$ such mean values. Then, a filtering process is performed using a low pass filter (LPF) on the mean values to obtain an unsharp image signal at the selected pixel location. If the LPF is a 1D filter, then $H_f$ is set equal to the length of the LPF, and the LPF is applied to the mean values to obtain the unsharp signal. If the LPF is a 2D filter, then $W_f$ and $H_f$ are set equal to the horizontal and vertical length of the LPF, respectively. A two-dimensional data array of the size $W_f$ and $H_f$ is then generated, wherein the data in each row of the array are all set to the corresponding pixel mean value of the same row in the $W_f$ and $H_f$ window of neighboring pixels. Then the LPF is applied to the data array to obtain the unsharp signal. The unsharp signal is then boosted and added back to the original signal as described above in relation to the vertical edges.

Further, although the example method and system herein are described for detecting and processing pixels in noisy and sharp horizontal and vertical image edges in image detail enhancement so that noise at those pixel locations is not boosted, those skilled in the art will recognize that the idea of the present invention may also be extended to detecting and processing pixels in noisy and sharp image edges that are not horizontal or vertical.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned detail enhancement system 500 according to the present invention can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of detail enhancement for an original image signal represented by a set of pixels, the method comprising the steps of:
   (a) detecting image pixels that belong to an image edge;
   (b) for a detected pixel, generating an unsharp image signal at the detected pixel location;

(c) determining the difference between the original image signal and the unsharp signal, wherein said difference represents image details; and (d) boosting the difference signal and adding the boosted signal to the original signal to obtain a detail enhanced image signal;

whereby boosting of any noise at the selected pixel location is reduced.

2. The method of claim 1 wherein in step (a) detecting image pixels that belong to an image edge, further includes the steps of detecting image pixels that belong to a horizontal or vertical image edge.

3. The method of claim 1 wherein in step (a) detecting image pixels that belong to an image edge, further includes the steps of detecting image pixels that belong to a noisy and sharp horizontal or vertical image edge.

4. The method of claim 1, wherein in step (b) generating an unsharp image signal further includes the steps of:

determining mean values of pixels in a two-dimensional window including the selected pixel; and using said mean values in a filtering process to obtain an unsharp image signal at the selected pixel location.

5. The method of claim 1, where in step (a) detecting image pixels that belong to an image edge further includes the steps of:

selecting a pixel; and based on the selected pixel and its neighboring pixels in a two-dimensional window, determining if the pixel belongs to an image edge;

wherein each pixel is checked separately to determine if it belongs to an image edge.

6. The method of claim 1, further comprising the steps of:

if a pixel is determined to belong to an image edge, then determining if the edge is noisy.

7. The method of claim 5, wherein detecting image pixels that belongs to an essentially vertical image edge further includes the steps of:

selecting at least W columns of pixels centered with the selected pixel, wherein each columns includes H pixels;

determining the mean value m of the pixels in each column, thereby generating W mean values;

determining the variance value σ of the pixels in each column, thereby generating W variance values; and based on the W mean values and the W variance values, determining if the selected pixel belongs to a vertical image edge.

8. The method of claim 7, wherein:

the mean values $m_j$ are determined according to the relation:

$$m_j = \frac{1}{H} \sum_{i=-\frac{H-1}{2}}^{\frac{H-1}{2}} I_{i,j}, \quad j = -1, 0, 1,$$

the variance values $\sigma_j$ are determined according to the relation:

$$\sigma_j = \frac{1}{H} \sum_{i=-\frac{H-1}{2}}^{\frac{H-1}{2}} |I_{i,j} - m_j|, \quad j = -1, 0, 1,$$

where $I_{i,j}$ is the value of a pixel located at row i and column j in the window, such that the row and column index of the selected pixel is 0.

9. The method of claim 7, wherein the steps of detecting if the selected pixel belongs to an image edge, further includes the steps of:

determining if $|m_0 - m_j| > \max(\sigma_0, \sigma_j)$, $j = -1$ or 1;

determining if $\max(|m_0 - m_1|, |m_0 - m_{-1}|) \geq T_m$;

where $T_m$ is a predetermined threshold value;

such that if $|m_0 - m_j| > \max(\sigma_0, \sigma_j)$, $j = -1$ or 1, and if $\max(|m_0 - m_1|, |m_0 - m_{-1}|) \geq T_m$, then the selected pixel is considered as a pixel in an image edge.

10. The method of claim 7, further comprising the steps of:

if the selected pixel is determined to belong to an image edge, then determining if the edge is noisy.

11. The method of claim 10, wherein the step of checking if the edge is noisy further includes the steps of:

generating binary pattern data b from pixels in column 0 of the window according to the relation:

$$b_{i,0} = \begin{cases} 0 & \text{if } I_{i,0} < m_0 \\ 1 & \text{if } I_{i,0} \geq m_0 \end{cases} \quad i = -\frac{H-1}{2}, \ldots, 0, \ldots, \frac{H-1}{2};$$

based on the binary pattern data, generating a count N of the number of neighboring binary pattern data that vary from each other according to the relation:

$$N = \sum_{i=-\frac{H-1}{2}}^{\frac{H-1}{2}-1} |b_{i,0} - b_{i+1,0}|;$$

comparing the count N to a predetermined threshold value $T_N$, $0 < T_N < H-1$;

if the count N is not less than $T_N$, then the edge is considered as noisy.

12. The method of claim 10, wherein the step of checking if the edge is noisy further includes the steps of:

generating binary pattern data b from pixels in column 0 of the window according to the relation:

$$b_{i,0} = \begin{cases} 0 & \text{if } I_{i,0} < m_0 \\ 1 & \text{if } I_{i,0} \geq m_0 \end{cases} \quad i = -\frac{H-1}{2}, \ldots, 0, \ldots, \frac{H-1}{2};$$

based on the binary pattern data, generating a count N of the number of neighboring binary pattern data that vary from each other according to the relation:

$$N = \sum_{i=-\frac{H-1}{2}}^{\frac{H-1}{2}-1} (b_{i,0} \oplus b_{i+1,0});$$

comparing the count N to a predetermined threshold value $T_N$, $0 < T_N < H-1$;

if the count N is not less than $T_N$, then the edge is considered as noisy.

13. The method of claim 4, wherein:

said window comprises a $W_f$ by $H_f$ rectangular window centered with the selected pixel;

13 if the image edge direction is vertical:
  determining the mean values further includes the step of determining the mean values of the pixels in each column of the window, wherein there are a total of $W_f$ such mean values;
  performing the filtering process further includes the steps of using a low pass filter (LPF) on the mean values to obtain an unsharp image signal at the selected pixel location.

14. The method of claim 13, wherein performing the filtering process further includes the steps of:
  selecting a one dimensional (1D) LPF, such that $W_f$ is equal to the length of the LPF;
  applying the LPF to the mean values to obtain the unsharp signal.

15. The method of claim 13, wherein performing the filtering process further includes the steps of:
  selecting a two dimensional (2D) LPF, such that $W_f$ and $H_f$ are equal to the horizontal and vertical length of the LPF, respectively;
  generating a two-dimensional data array of the size $W_f$ by $H_f$, wherein the data in each column of the array are all set to the corresponding pixel mean value of the same column in the $W_f$ by $H_{71}$ window of neighboring pixels; and
  applying the LPF to the array data to obtain the unsharp signal.

16. The method of claim 5, wherein detecting image pixels that belong to an essentially horizontal image edge further includes the steps of:
  selecting at least H rows of pixels centered with the selected pixel, wherein each row includes W pixels;
  determining the mean value of the pixels in each row, thereby generating H mean values;
  determining the variance value of the pixels in each row, thereby generating H variance values;
  based on the H mean values and the H variance values, determining if the selected pixel belongs to a horizontal image edge.

17. The method of claim 16, wherein:
the mean values $m_i$ are determined according to the relation:

$$m_i = \frac{1}{W} \sum_{j=-\frac{W-1}{2}}^{\frac{W-1}{2}} I_{i,j} \quad i = -1, 0, 1,$$

the variance values $\sigma_i$ are determined according to the relation:

$$\sigma_i = \frac{1}{W} \sum_{j=-\frac{W-1}{2}}^{\frac{W-1}{2}} |I_{i,j} - m_i| \quad i = -1, 0, 1,$$

where $I_{i,j}$ is the value of a pixel located at row i and column j in the window, such that the row and column index of the selected pixel is 0.

18. The method of claim 16, wherein the steps of detecting if the selected pixel belongs to an image edge, further includes the steps of:
  determining if $|m_0 - m_i| > \max(\sigma_0, \sigma_i)$, $i = -1$ or $1$;
  determining if $\max(|m_0 - m_i|, |m_0 - m_{-1}|) \geq T_m$;

14 where $T_m$ is a predetermined threshold value;
such that if $|m_0 - m_i| > \max(\tau_0, \sigma_i)$, $i = -1$ or $1$, and if $\max(|m_0 - m_1|, |m_0 - m_{-1}|) \geq T_m$, then the selected pixel is considered as a pixel in an image edge.

19. The method of claim 16, further comprising the steps of:
  if the selected pixel is determined to belong to an image edge, then determining if the edge is noisy.

20. The method of claim 19, wherein the step of checking if the edge is noisy further includes the steps of:
  generating binary pattern data b from pixels in row 0 of the window according to the relation:

$$b_{0,j} = \begin{cases} 0 & \text{if } I_{0,j} < m_0 \\ 1 & \text{if } I_{0,j} \geq m_0 \end{cases} \quad j = -\frac{W-1}{2}, \ldots, 0, \ldots, \frac{W-1}{2};$$

based on the binary pattern data, generating a count N of the number of neighboring binary pattern data that vary from each other according to the relation:

$$N = \sum_{j=-\frac{W-1}{2}}^{\frac{W-1}{2}-1} |b_{0,j} - b_{0,j+1}|;$$

comparing the count N to a predetermined threshold value $T_N$, $0 < T_N < W-1$;
if the count N is not less than $T_N$, then the edge is considered as noisy.

21. The method of claim 19, wherein the step of checking if the edge is noisy further includes the steps of:
  generating binary pattern data b from pixels in row 0 of the window according to the relation:

$$b_{0,j} = \begin{cases} 0 & \text{if } I_{0,j} < m_0 \\ 1 & \text{if } I_{0,j} \geq m_0 \end{cases} \quad j = -\frac{W-1}{2}, \ldots, 0, \ldots, \frac{W-1}{2};$$

based on the binary pattern data, generating a count N of the number of neighboring binary pattern data that vary from each other according to the relation:

$$N = \sum_{j=-\frac{W-1}{2}}^{\frac{W-1}{2}-1} (b_{0,j} \oplus b_{0,j+1});$$

comparing the count N to a predetermined threshold value $T_N$, $0 < T_N < W-1$;
if the count N is not less than $T_N$, then the edge is considered as noisy.

22. The method of claim 4, wherein:
said window comprises a $W_f$ by $H_f$ rectangular window centered with the selected pixel;
if the image edge direction is horizontal:
  determining the mean values further includes the step of determining the mean values of the pixels in each row of the window, wherein there are a total of $H_f$ such mean values;

performing the filtering process further includes the steps of using a low pass filter (LPF) on the mean values to obtain an unsharp image signal at the selected pixel location.

23. The method of claim 22, wherein performing the filtering process further includes the steps of:
selecting a one dimensional (1D) LPF, such that $H_f$ is equal to the length of the LPF;
applying the LPF to the mean values to obtain the unsharp signal.

24. The method of claim 22, wherein performing the filtering process further includes the steps of:
selecting a two dimensional (2D) LPF, such that $W_f$ and $H_f$ are equal to the horizontal and vertical length of the LPF, respectively;
generating a two-dimensional data array of the size $W_f$ by $H_f$, wherein the data in each row of the array are all set to the corresponding pixel mean value of the same row in the $W_f$ by $H_f$ window of neighboring pixels; and
applying the LPF to the array data to obtain the unsharp signal.

25. The method of claim 1, further comprising the steps of, for a pixel that is not detected as belonging to an image edge in step (a):
performing a filtering process on the pixel to obtain an unsharp signal at that pixel location;
determining the difference between the original signal and the unsharp signal at the pixel location, wherein the difference represents image detail;
boosting the image detail, and adding the boosted image detail to the original image signal to obtain a detail enhanced image.

26. An image detail enhancement system for enhancing an original image signal represented by a set of pixels, comprising:
(a) a detector that detects image pixels that belong to an image edge; and
(b) an edge enhancer that, for a detected pixel, generates an unsharp image signal at the detected pixel location, determines the difference between the original image signal and the unsharp signal, wherein said difference represents image details, boosts the difference signal and adds the boosted signal to the original signal to obtain a detail enhanced image signal, whereby boosting of any noise at the selected pixel location is reduced.

27. The system of claim 26 wherein the detector further detects image pixels that belong to a horizontal or vertical image edge.

28. The system of claim 26 wherein the detector further detects image pixels that belong to a noisy and sharp horizontal or vertical image edge.

29. The system of claim 26 wherein the edge enhancer further generates an unsharp image signal by determining mean values of pixels in a two-dimensional window including the selected pixel, and using said mean values in a filtering process to obtain the unsharp image signal at the selected pixel location.

30. The system of claim 26 wherein in detecting image pixels that belong to an image edge, the detector selects a pixel and based on the selected pixel and its neighboring pixels in a two-dimensional window, determines if the pixel belongs to an image edge, wherein each pixel is checked separately to determine if it belongs to an image edge.

31. The system of claim 26 wherein if a pixel is determined to belong to an image edge, the detector further determining if the edge is noisy.

32. The system of claim 30, wherein to detect image pixels that belong to an essentially vertical image edge, the detector further:
selects at least W columns of pixels centered with the selected pixel, wherein each columns includes H pixels;
determines the mean value m of the pixels in each column, thereby generating W mean values;
determines the variance value σ of the pixels in each column, thereby generating W variance values; and
based on the W mean values and the W variance values, determines if the selected pixel belongs to a vertical image edge.

33. The system of claim 32, wherein:
the mean values $m_j$ are determined according to the relation:

$$m_j = \frac{1}{H} \sum_{i=-\frac{H-1}{2}}^{\frac{H-1}{2}} I_{i,j}, \; j = -1, 0, 1,$$

the variance values $\sigma_j$ are determined according to the relation:

$$\sigma_j = \frac{1}{H} \sum_{i=-\frac{H-1}{2}}^{\frac{H-1}{2}} |I_{i,j} - m_j|, \; j = -1, 0, 1,$$

where $I_{i,j}$ is the value of a pixel located at row i and column j in the window, such that the row and column index of the selected pixel is 0.

34. The system of claim 32, wherein in detecting if the selected pixel belongs to an image edge, the detector further:
determines if $|m_0-m_j|>\max(\sigma_0,\sigma_j)$, j=−1 or 1;
determines if $\max(|m_0-m_1|,|m_0-m_{-1}|) \geq T_m$;
where $T_m$ is a predetermined threshold value;
such that if $|m_0-m_j|>\max(\sigma_0,\sigma_j)$, j=−1 or 1, and if max $(|m_0-m_1|,|m_0-m_{-1}|) \geq T_m$, then the selected pixel is considered as a pixel in an image edge.

35. The system of claim 32, wherein if the selected pixel is determined to belong to an image edge, the detector further determines if the edge is noisy.

36. The system of claim 35, wherein in determining if the edge is noisy, the detector further:
generates binary pattern data b from pixels in column 0 of the window according to the relation:

$$b_{i,0} = \begin{cases} 0 & \text{if } I_{i,0} < m_0 \\ 1 & \text{if } I_{i,0} \geq m_0 \end{cases} \; i = -\frac{H-1}{2}, \cdots, 0, \cdots, \frac{H-1}{2};$$

based on the binary pattern data, generates a count N of the number of neighboring binary pattern data that vary from each other according to the relation:

$$N = \sum_{i=-\frac{H-1}{2}}^{\frac{H-1}{2}-1} |b_{i,0} - b_{i+1,0}|;$$

compares the count N to a predetermined threshold value $T_N$, $0<T_N<H-1$;
wherein if the count N is not less than $T_N$, then the edge is considered as noisy.

37. The system of claim 35, wherein in determining if the edge is noisy, the detector further:
generates binary pattern data b from pixels in column 0 of the window according to the relation:

$$b_{i,0} = \begin{cases} 0 & \text{if } I_{i,0} < m_0 \\ 1 & \text{if } I_{i,0} \geq m_0 \end{cases} \quad i = -\frac{H-1}{2}, \cdots, 0, \cdots, \frac{H-1}{2}$$

based on the binary pattern data, generates a count N of the number of neighboring binary pattern data that vary from each other according to the relation:

$$N = \sum_{i=-\frac{H-1}{2}}^{\frac{H-1}{2}-1} (b_{i,0} \oplus b_{i+1,0});$$

compares the count N to a predetermined threshold value $T_N$, $0<T_N<H-1$;
wherein if the count N is not less than $T_N$, then the edge is considered as noisy.

38. The system of claim 29, wherein:
said window comprises a $W_f$ by $H_f$ rectangular window centered with the selected pixel;
if the image edge direction is vertical, the edge enhancer further:
determines the mean values of the pixels in each column of the window, wherein there are a total of $W_f$ such mean values;
includes a low pass filter (LPF) that filters the mean values to obtain an unsharp image signal at the selected pixel location.

39. The system of claim 38, wherein the LPF comprises a one dimensional (1D) LPF, such that $W_f$ is equal to the length of the LPF.

40. The system of claim 38, wherein:
the LPF comprises a two dimensional (2D) LPF, such that $W_f$ and $H_f$ are equal to the horizontal and vertical length of the LPF, respectively;
the edge enhancer further generates a two-dimensional data array of the size $W_f$ by $H_f$, wherein the data in each column of the array are all set to the corresponding pixel mean value of the same column in the $W_f$ by $H_f$ window of neighboring pixels; and
the data array is filtered by the LPF to obtain the unsharp signal.

41. The system of claim 30, wherein to detect image pixels that belong to an essentially horizontal image edge, the detector further:
selects at least H rows of pixels centered with the selected pixel, wherein each row includes W pixels;
determines the mean value of the pixels in each row, thereby generating H mean values;
determines the variance value of the pixels in each row, thereby generating H variance values;
based on the H mean values and the H variance values, determines if the selected pixel belongs to a horizontal image edge.

42. The system of claim 41, wherein:
the mean values $m_i$ are determined according to the relation:

$$m_i = \frac{1}{W} \sum_{j=-\frac{W-1}{2}}^{\frac{W-1}{2}} I_{i,j}, \, i = -1, 0, 1,$$

the variance values $\sigma_i$ are determined according to the relation:

$$\sigma_i = \frac{1}{W} \sum_{j=-\frac{W-1}{2}}^{\frac{W-1}{2}} |I_{i,j} - m_i|, \, i = -1, 0, 1,$$

where $I_{i,j}$ is the value of a pixel located at row i and column j in the window, such that the row and column index of the selected pixel is 0.

43. The system of claim 41, wherein in detecting if the selected pixel belongs to an image edge, the detector further:
determines if $|m_0-m_i|>\max(\sigma_0,\sigma_i)$, $i=-1$ or 1;
determines if $\max(|m_0-m_1|,|m_0-m_{-1}|) \geq T_m$;
where $T_m$ is a predetermined threshold value;
such that if $|m_0-m_i|>\max(\sigma_0,\sigma_i)$, $i=-1$ or 1, and if $\max(|m_0-m_1|,|m_0-m_{-1}|) \geq T_m$, then the selected pixel is considered as a pixel in an image edge.

44. The system of claim 41, wherein if the selected pixel is determined to belong to an image edge, the detector further determines if the edge is noisy.

45. The system of claim 44, wherein in detecting if the edge is noisy, the detector further:
generates binary pattern data b from pixels in row 0 of the window according to the relation:

$$b_{0,j} = \begin{cases} 0 & \text{if } I_{0,j} < m_0 \\ 1 & \text{if } I_{0,j} \geq m_0 \end{cases} \quad j = -\frac{W-1}{2}, \cdots, 0, \cdots, \frac{W-1}{2};$$

based on the binary pattern data, generates a count N of the number of neighboring binary pattern data that vary from each other according to the relation:

$$N = \sum_{j=-\frac{W-1}{2}}^{\frac{W-1}{2}-1} |b_{0,j} - b_{0,j+1}|;$$

compares the count N to a predetermined threshold value $T_N$, $0<T_N<W-1$;
wherein if the count N is not less than $T_N$, then the edge is considered as noisy.

46. The system of claim 44, wherein in detecting if the edge is noisy, the detector further:
generates binary pattern data b from pixels in row 0 of the window according to the relation:

$$b_{0,j} = \begin{cases} 0 & \text{if } I_{0,j} < m_0 \\ 1 & \text{if } I_{0,j} \geq m_0 \end{cases} \quad j = -\frac{W-1}{2}, \cdots, 0, \cdots, \frac{W-1}{2};$$

based on the binary pattern data, generates a count N of the number of neighboring binary pattern data that vary from each other according to the relation:

$$N = \sum_{j=-\frac{W-1}{2}}^{\frac{W-1}{2}-1} (b_{0,j} \oplus b_{0,j+1});$$

compares the count N to a predetermined threshold value $T_N$, $0<T_N<W-1$;
wherein if the count N is not less than $T_N$, then the edge is considered as noisy.

47. The system of claim 29, wherein:
said window comprises a $W_f$ by $H_f$ rectangular window centered with the selected pixel;
if the image edge direction is horizontal, the edge enhancer further:
determines the mean values of the pixels in each row of the window, wherein there are a total of $H_f$ such mean values;
includes a low pass filter (LPF) for performing a filtering process on the mean values to obtain an unsharp image signal at the selected pixel location.

48. The system of claim 47, wherein the LPF comprises a one dimensional (1D) LPF, such that $H_f$ is equal to the length of the LPF.

49. The system of claim 47, wherein:
the LPF comprises a two dimensional (2D) LPF, such that $W_f$ and $H_f$ are equal to the horizontal and vertical length of the LPF, respectively;
the edge enhancer further generates a two-dimensional data array of the size $W_f$ by $H_f$, wherein the data in each row of the array are all set to the corresponding pixel mean value of the same row in the $W_f$ by $H_f$ window of neighboring pixels; and
LPF filters the array data to obtain the unsharp signal.

50. The system of claim 26, further comprising a normal enhancer, wherein for a pixel that is not detected as belonging to an image edge, the normal enhancer performs a filtering process on the pixel to obtain an unsharp signal at that pixel location, determines the difference between the original signal and the unsharp signal at the pixel location, wherein the difference represents image detail, boosts the image detail and adds the boosted image detail to the original image signal to obtain a detail enhanced image.

51. An image detail enhancement system for enhancing an original image signal represented by a set of pixels, comprising:
(a) a detector that detects image pixels that belong to an image edge;
(b) an edge enhancer that, for a detected pixel, generates an unsharp image signal at the detected pixel location, determines the difference between the original image signal and the unsharp signal, wherein said difference represents image details, boosts the difference signal and adds the boosted signal to the original signal to obtain a detail enhanced image signal, whereby boosting of any noise at the selected pixel location is reduced; and
(c) a normal enhancer, wherein for a pixel that is not detected as belonging to an image edge, the normal enhancer performs a filtering process on the pixel to obtain an unsharp signal at that pixel location, determines the difference between the original signal and the unsharp signal at the pixel location, wherein the difference represents image detail, boosts the image detail and adds the boosted image detail to the original image signal to obtain a detail enhanced image;
wherein upon determining that an image pixel belongs to an image edge, the detector selects the edge enhancer to enhance that image pixel, and upon determining that an image pixel does not belong to an image edge, the detector selects the normal enhancer to enhance that image pixel.

52. The system of claim 51 wherein the detector further detects image pixels that belong to a horizontal or vertical image edge.

53. The system of claim 51 wherein the detector further detects image pixels that belong to a noisy and sharp horizontal or vertical image edge.

54. The system of claim 51 wherein the edge enhancer further generates an unsharp image signal by determining mean values of pixels in a two-dimensional window including the selected pixel, and using said mean values in a filtering process to obtain the unsharp image signal at the selected pixel location.

55. The system of claim 51 wherein in detecting image pixels that belong to an image edge, the detector selects a pixel and based on the selected pixel and its neighboring pixels in a two-dimensional window, determines if the pixel belongs to an image edge, wherein each pixel is checked separately to determine if it belongs to an image edge.

56. The system of claim 51 wherein if a pixel is determined to belong to an image edge, the detector further determining if the edge is noisy.

57. The system of claim 55, wherein to detect image pixels that belong to an essentially vertical image edge, the detector further:
selects at least W columns of pixels centered with the selected pixel, wherein each columns includes H pixels;
determines the mean value m of the pixels in each column, thereby generating W mean values;
determines the variance value a of the pixels in each column, thereby generating W variance values; and
based on the W mean values and the W variance values, determines if the selected pixel belongs to a vertical image edge.

58. The system of claim 57, wherein:
the mean values $m_j$ are determined according to the relation:

$$m_j = \frac{1}{H} \sum_{i=-\frac{H-1}{2}}^{\frac{H-1}{2}} I_{i,j}, j = -1, 0, 1,$$

the variance values $\sigma_j$ are determined according to the relation:

$$\sigma_j = \frac{1}{H} \sum_{i=-\frac{H-1}{2}}^{\frac{H-1}{2}} |I_{i,j} - m_j|, j = -1, 0, 1,$$

where $I_{i,j}$ is the value of a pixel located at row i and column j in the window, such that the row and column index of the selected pixel is 0.

59. The system of claim 57, wherein in detecting if the selected pixel belongs to an image edge, the detector further:
determines if $|m_0-m_j|>\max(\sigma_0,\sigma_j)$, $j=-1$ or 1;
determines if $\max(|m_0-m_1|,|m_0-m_{-1}|) \geq T_m$;
where $T_m$ is a predetermined threshold value;
such that if $|m_0-m_j|>\max(\sigma_0,\sigma_j)$, $j=-1$ or 1, and if $\max(|m_0-m_1|,|m_0-m_{-1}|) \geq T_m$, then the selected pixel is considered as a pixel in an image edge.

60. The system of claim 57, wherein if the selected pixel is determined to belong to an image edge, the detector further determines if the edge is noisy.

61. The system of claim 60, wherein in determining if the edge is noisy, the detector further:
generates binary pattern data b from pixels in column 0 of the window according to the relation:

$$b_{i,0} = \begin{cases} 0 & \text{if } I_{i,0} < m_0 \\ 1 & \text{if } I_{i,0} \geq m_0 \end{cases} \quad i = -\frac{H-1}{2}, \cdots, 0, \cdots, \frac{H-1}{2};$$

based on the binary pattern data, generates a count N of the number of neighboring binary pattern data that vary from each other according to the relation:

$$N = \sum_{i=-\frac{H-1}{2}}^{\frac{H-1}{2}-1} |b_{i,0} - b_{i+1,0}|;$$

compares the count N to a predetermined threshold value $T_N$, $0 < T_N < H-1$;
wherein if the count N is not less than $T_N$, then the edge is considered as noisy.

62. The system of claim 60, wherein in determining if the edge is noisy, the detector further:
generates binary pattern data b from pixels in column 0 of the window according to the relation:

$$b_{i,0} = \begin{cases} 0 & \text{if } I_{i,0} < m_0 \\ 1 & \text{if } I_{i,0} \geq m_0 \end{cases} \quad i = -\frac{H-1}{2}, \cdots, 0, \cdots, \frac{H-1}{2};$$

based on the binary pattern data, generates a count N of the number of neighboring binary pattern data that vary from each other according to the relation:

$$N = \sum_{i=-\frac{H-1}{2}}^{\frac{H-1}{2}-1} (b_{i,0} \oplus b_{i+1,0});$$

compares the count N to a predetermined threshold value $T_N$, $0 < T_N < H-1$;
wherein if the count N is not less than $T_N$, then the edge is considered as noisy.

63. The system of claim 54, wherein:
said window comprises a $W_f$ by $H_f$ rectangular window centered with the selected pixel;
the edge enhancer includes a vertical edge enhancer, such that if the image edge direction is vertical, the detector selects the vertical edge enhancer such that the vertical edge enhancer:
determines the mean values of the pixels in each column of the window, wherein there are a total of $W_f$ such mean values; and
includes a low pass filter (LPF) that filters the mean values to obtain an unsharp image signal at the selected pixel location.

64. The system of claim 63, wherein the LPF comprises a one dimensional (1D) LPF, such that $W_f$ is equal to the length of the LPF.

65. The system of claim 63, wherein:
the LPF comprises a two dimensional (2D) LPF, such that $W_f$ and $H_f$ are equal to the horizontal and vertical length of the LPF, respectively;
the vertical edge enhancer further generates a two-dimensional data array of the size $W_f$ by $H_f$, wherein the data in each column of the array are all set to the corresponding pixel mean value of the same column in the $W_f$ by $H_f$ window of neighboring pixels; and
the data array is filtered by the LPF to obtain the unsharp signal.

66. The system of claim 55, wherein to detect image pixels that belong to an essentially horizontal image edge, the detector further:
selects at least H rows of pixels centered with the selected pixel, wherein each row includes W pixels;
determines the mean value of the pixels in each row, thereby generating H mean values;
determines the variance value of the pixels in each row, thereby generating H variance values;
based on the H mean values and the H variance values, determines if the selected pixel belongs to a horizontal image edge.

67. The system of claim 66, wherein:
the mean values $m_i$ are determined according to the relation:

$$m_i = \frac{1}{W} \sum_{j=-\frac{W-1}{2}}^{\frac{W-1}{2}} I_{i,j}, \quad i = -1, 0, 1,$$

the variance values $\sigma_i$ are determined according to the relation:

$$\sigma_i = \frac{1}{W} \sum_{j=-\frac{W-1}{2}}^{\frac{W-1}{2}} |I_{i,j} - m_i|, \quad i = -1, 0, 1,$$

where $I_{i,j}$ is the value of a pixel located at row i and column j in the window, such that the row and column index of the selected pixel is 0.

68. The system of claim 66, wherein in detecting if the selected pixel belongs to an image edge, the detector further:
determines if $|m_0-m_i|>\max(\sigma_0,\sigma_i)$, $i=-1$ or 1;
determines if $\max(|m_0-m_1|,|m_0-m_{-1}|) \geq T_m$;
where $T_m$ is a predetermined threshold value;
such that if $|m_0-m_i|>\max(\sigma_0,\sigma_i)$, $i=-1$ or 1, and if $\max(|m_0-m_1|,|m_0-m_{-1}|) \geq T_m$, then the selected pixel is considered as a pixel in an image edge.

69. The system of claim 66, wherein if the selected pixel is determined to belong to an image edge, the detector further determines if the edge is noisy.

70. The system of claim 69, wherein in detecting if the edge is noisy, the detector further:

generates binary pattern data b from pixels in row 0 of the window according to the relation:

$$b_{0,j} = \begin{cases} 0 & \text{if } I_{0,j} < m_0 \\ 1 & \text{if } I_{0,j} \geq m_0 \end{cases} \quad j = -\frac{W-1}{2}, \cdots, 0, \cdots, \frac{W-1}{2};$$

based on the binary pattern data, generates a count N of the number of neighboring binary pattern data that vary from each other according to the relation:

$$N = \sum_{j=-\frac{W-1}{2}}^{\frac{W-1}{2}-1} |b_{0,j} - b_{0,j+1}|;$$

compares the count N to a predetermined threshold value $T_N$, $0 < T_N < W-1$;

wherein if the count N is not less than $T_N$, then the edge is considered as noisy.

71. The system of claim 69, wherein in detecting if the edge is noisy, the detector further:

generates binary pattern data b from pixels in row 0 of the window according to the relation:

$$b_{0,j} = \begin{cases} 0 & \text{if } I_{0,j} < m_0 \\ 1 & \text{if } I_{0,j} \geq m_0 \end{cases} \quad j = -\frac{W-1}{2}, \cdots, 0, \cdots, \frac{W-1}{2};$$

based on the binary pattern data, generates a count N of the number of neighboring binary pattern data that vary from each other according to the relation:

$$N = \sum_{j=-\frac{W-1}{2}}^{\frac{W-1}{2}-1} (b_{0,j} \oplus b_{0,j+1});$$

compares the count N to a predetermined threshold value $T_N$, $0 < T_N < W-1$;

wherein if the count N is not less than $T_N$, then the edge is considered as noisy.

72. The system of claim 54, wherein:

said window comprises a $W_f$ by $H_f$ rectangular window centered with the selected pixel;

the edge enhancer includes a horizontal edge enhancer, wherein if the image edge direction is horizontal, the detector selects the horizontal edge enhancer such that the horizontal edge enhancer:

determines the mean values of the pixels in each row of the window, wherein there are a total of $H_f$ such mean values; and includes a low pass filter (LPF) for performing a filtering process on the mean values to obtain an unsharp image signal at the selected pixel location.

73. The system of claim 72, wherein the LPF comprises a one dimensional (1D) LPF, such that $H_f$ is equal to the length of the LPF.

74. The system of claim 72, wherein:

the LPF comprises a two dimensional (2D) LPF, such that $W_f$ and $H_f$ are equal to the horizontal and vertical length of the LPF, respectively;

the horizontal edge enhancer further generates a two-dimensional data array of the size $W_f$ by $H_f$, wherein the data in each row of the array are all set to the corresponding pixel mean value of the same row in the $W_f$ by $H_f$ window of neighboring pixels; and LPF filters the array data to obtain the unsharp signal.

* * * * *